Oct. 26, 1954    J. H. DAVIS, JR., ET AL    2,692,750
NEEDLE VALVE SEATING ARRANGEMENT
Filed March 31, 1950

INVENTORS
John H. Davis, Jr.
Andrew P. Nelson
BY
Blair & Black
ATTORNEYS

Patented Oct. 26, 1954

2,692,750

UNITED STATES PATENT OFFICE 2,692,750

NEEDLE VALVE SEATING ARRANGEMENT

John H. Davis, Jr., New York, N. Y., and Andrew P. Nelson, Cranford, N. J., assignors to Alloy Steel Products Company, Incorporated, Linden, N. J.

Application March 31, 1950, Serial No. 153,204

1 Claim. (Cl. 251—210)

The invention relates to a needle valve and more particularly to a needle valve which resists corrosion and wear and which will not leak by fouling or after long usage with strong reagents.

Various types and sizes of needle valves are in wide use to regulate the flow of fluids through lines, and sampling valves of the needle type are used on storage tanks and the like. When strong reagents are passed through such valves or when solid impurities are contained in the fluid, corrosion and galling frequently occur to a metal-to-metal valve seat with the result that after prolonged use leakage occurs around the eroded parts. Also, solid particles may deposit on the seat and prevent the valve being closed. Attempts have been made to remedy this by attaching a non-metallic washer to the base of the valve stem so that the seat will be more elastic, but such an arrangement has not been satisfactory because the washers wear rapidly and become deformed by ordinary plastic flow.

Accordingly, it is one of the objects of the invention to provide a valve which is highly corrosion-resistant and which will not gall at the seat, so that even after long usage there will be no leakage. Another object is to provide a valve which will close completely even when solid particles become deposited at the seat, and which is economical in construction and sturdy enough to withstand long use. A further object is to avoid plastic deformation of a resilient valve seat. A still further object is to provide a valve which may be disassembled conveniently for purposes of cleaning and replacement of the parts should this be necessary. These and other objects of the invention will be in part pointed out and in part apparent from the description which follows.

The invention accordingly consists in the features of construction, combinations of elements, and arrangements of parts as will be exemplified in the structure to be hereinafter described, and the scope of the application of which will be indicated in the following claim.

Referring to the drawings.

It is to be understood that the arrangement which is described herein may be adapted to any needle valve whether it be a globe type, angle valve, sampling valve, etc. In outward appearance the valve is similar to those in general use, having one or more adapters to which fluid lines may be attached, and a protruding stem provided with a hand wheel for opening and closing the valve. The body of the valve is constructed to receive a corrosion-resistant plastic washer around the fluid inlet, a bonnet with an elongated sleeve fitting into the body so that when it is clamped with the union ring this plastic washer is firmly held in place by the sleeve. The sleeve is provided with ports through which fluid may pass, and a needle-pointed stem, threaded to the inside of this bonnet sleeve, is shouldered above the needle point to give a snug fit along the inside of the bonnet sleeve. With this arrangement the needle point may be seated against the plastic washer to seal completely the opening for fluid flow, even though corrosion of parts and presence of solid particles tend to distort the seat, and the washer is completely encased in metal to prevent its deformation.

Figure 1:
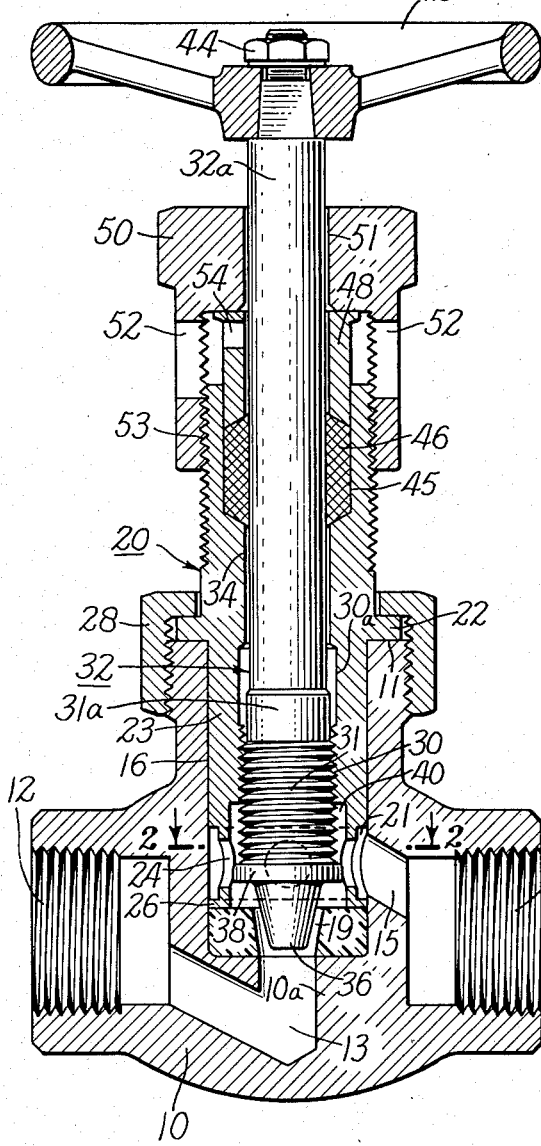
Fig. 1 is a vertical-sectional view of a needle valve.

Referring to Fig. 1, in which is illustrated a globe type needle valve, valve body 10 is machined with a fluid inlet 13 and outlet 15 and corresponding adapters 12 and 14 for attaching fluid lines (not shown) and a cylindrical bore 16 which receives at the base 10a thereof a plastic washer 18 of substantially the same diameter as the bore and with a hole 19 at its center about the size of inlet 13. A bonnet 20 has a sleeve 23 which fits into bore 16 with very little tolerance and has an upper bonnet shoulder 22 which rests on top surface 11 of body 10.

Figure 2:
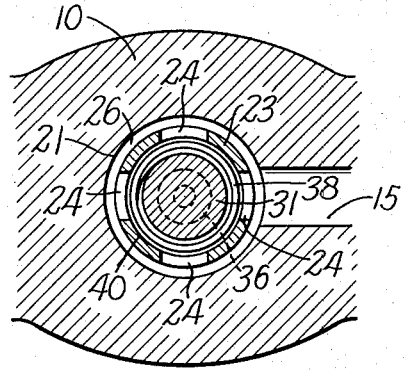
Fig. 2 is an enlarged horizontal section taken along line 2—2 in Fig. 1.

Sleeve 23 has at its lower end an annular recess 21 (Fig. 3) provided with ports 24 through which fluid may pass to outlet 15 (Fig. 2). Immediately below recess 21 is a lower bonnet shoulder 26 which fits snugly inside bore 16 and against washer 18, the length of sleeve 23 and the thickness of washer 18 being so proportioned that when upper bonnet shoulder 22 (Fig. 1) is clamped by union ring 28 against top surface 11 of body 10, washer 18 will be somewhat compressed and thus firmly held in place. By this arrangement body 10 is provided with a resilient, corrosion-resistant washer which is permanently held in place so that a suitable needle may be seated against it to prevent flow through the valve.

Bonnet 20 is hollow on the inside and has bores of different diameters to receive a stem, generally indicated at 32, which may be moved up or down by rotation of a hand wheel 42 that is secured to the top of shaft 32a of stem 32 with a nut 44. Sleeve 23 of bonnet 20 has a threaded bore 30 to receive threaded shank 31 of stem 32 for vertical adjustment of the stem, a collar portion 31a of stem 32 restricting upward movement by riding to the top of section 30a of bore 30. The elongated shaft 32a of stem 32 projects through bearing 34 and stuffing box 45 of bonnet 20, and through a hole 51 in packing nut 50.

Figure 3:
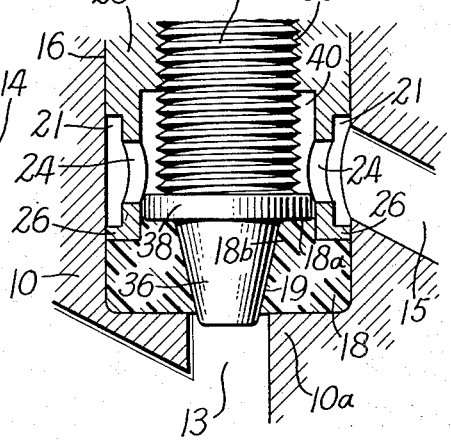
Fig. 3 is an enlarged fragmentary sectional view of the seat of the valve shown in Fig. 1, showing the closed position of the needle point.

Sleeve 23 (Fig. 3) has at its lower end a bore 40 of greater diameter than its threaded bore 30. Shank 31 of stem 32 is provided with a shoulder 38 which fits with but little clearance inside bore 40 so as to substantially cover the top exposed surface 18a of washer 18 when the valve is closed (Fig. 3). A needle point 36 shaped like an inverted cone at the very end of stem 32 fits into hole 19 of washer 18 to seal the line against the passage of fluid. In this way washer 18 is completely encased in metal when the valve is closed so that little or no plastic deformation can take place, for as shown in Fig. 3, the entire top surface is covered by lower bonnet shoulder 26 and stem shoulder 38, hole 19 becomes lined by needle point 36, and the entire bottom surface rests on base 10a of body 10. What little flow of washer 18 can take place is in the region 18b around the top of needle point 36 and beneath shoulder 38. Such flow, however, advantageously increases and perfects the seal between the washer and the valve stem because the material of which the washer is made, being both incompressible, and completely confined by the metal parts described cannot be reduced in volume nor can it escape. Thus long and efficient wear of the washer is assured.

Washer 18 is preferably made of a plastic which is chemically inert and thus able to resist nearly all types of corrosion even at moderately high temperatures. Should any foreign particles become deposited at the seat they will merely imbed in plastic washer 18 when the valve is closed instead of preventing its closing and abrading needle point 36 and its seat. Consequently there is always an absolutely tight seal which does not leak even after long use with strong solutions which ordinarily do corrosion damage.

Shaft 32a of stem 32 is "packed" to prevent leakage. Stuffing box 45 of bonnet 20 is filled with a suitable packing 46 which surrounds shaft 32a, and a packing nut 50 is threaded at 53 to screw onto the top of bonnet 20 and depress a gland follower 48 which is bevelled at the bottom to compress packing 46 around shaft 32a. By this arrangement leakage around the shaft is avoided and yet the stem may be rotated to control the valve. Nevertheless, a hole 52 in packing nut 50 and a weep hole 54 in gland follower 48 at a point above the packing are provided to give warning should leakage occur so that the packing can be tightened or replaced, whichever may be necessary.

Access may be had to the washer and needle point simply by unscrewing union ring 28 which is fitted to the top of body 10 and lifting out the bonnet and stem assembly. Thus parts may be replaced, cleaned or inspected very quickly and conveniently.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

What is claimed is:

A fluid flow control valve comprising in combination a body having communicating inlet and outlet openings and a bonnet receiving bore communicating with said openings, said bonnet receiving bore substantially concentric with said inlet opening and of substantially larger diameter than said opening to form an annular shoulder surrounding said inlet, a resilient washer of pliable plastic disposed in said bore around said inlet, said washer of substantially the same diameter as said bore, one plane face of said washer covering and engaging the annular shoulder surrounding said inlet, a concentric tapered opening through said washer, the smaller diameter of said opening substantially corresponding to the diameter of said inlet and aligned therewith, said aligned smaller opening being in the side of said washer adjacent said annular shoulder, a bonnet mounted on said body, a cylindrical sleeve portion of said bonnet extending into said bore and engaging the face of said washer opposite said inlet opening adjacent the peripheral edge thereof to hold said washer firmly against said annular shoulder, a valve stem reciprocally mounted within said bonnet, a uniformly tapered needle point on the end of said stem, the taper of said needle conforming to the taper of said washer opening, an annular flanged collar surrounding the larger portion of said needle, the diameter of said collar substantially conforming to the inner diameter of said cylindrical bonnet sleeve, whereby said collar and said bonnet sleeve completely cover the normally exposed face of said washer and said tapered needle uniformly engages the wall of said washer opening when said valve stem is moved downwardly to close said valve.

References Cited in the file of this patent

UNITED STATES PATENTS

| Number | Name | Date |
|---|---|---|
| 274,364 | Oldendorph | Mar. 20, 1883 |
| 1,616,420 | Wilson | Feb. 1, 1927 |
| 2,208,929 | Jaegle | July 23, 1940 |
| 2,485,092 | Gannon | Oct. 18, 1949 |
| 2,520,092 | Fredrickson | Aug. 22, 1950 |
| 2,252,923 | Granetz | Aug. 19, 1953 |

FOREIGN PATENTS

| Number | Country | Date |
|---|---|---|
| 38,506 | Switzerland | 1906 |
| 17,395 | Great Britain | 1907 |
| 320,744 | Great Britain | 1929 |